No. 855,588. PATENTED JUNE 4, 1907.
T. N. PRUDDEN.
METHOD AND APPARATUS FOR PROTECTING MARINE WOODEN STRUCTURES.
APPLICATION FILED FEB. 19, 1906.
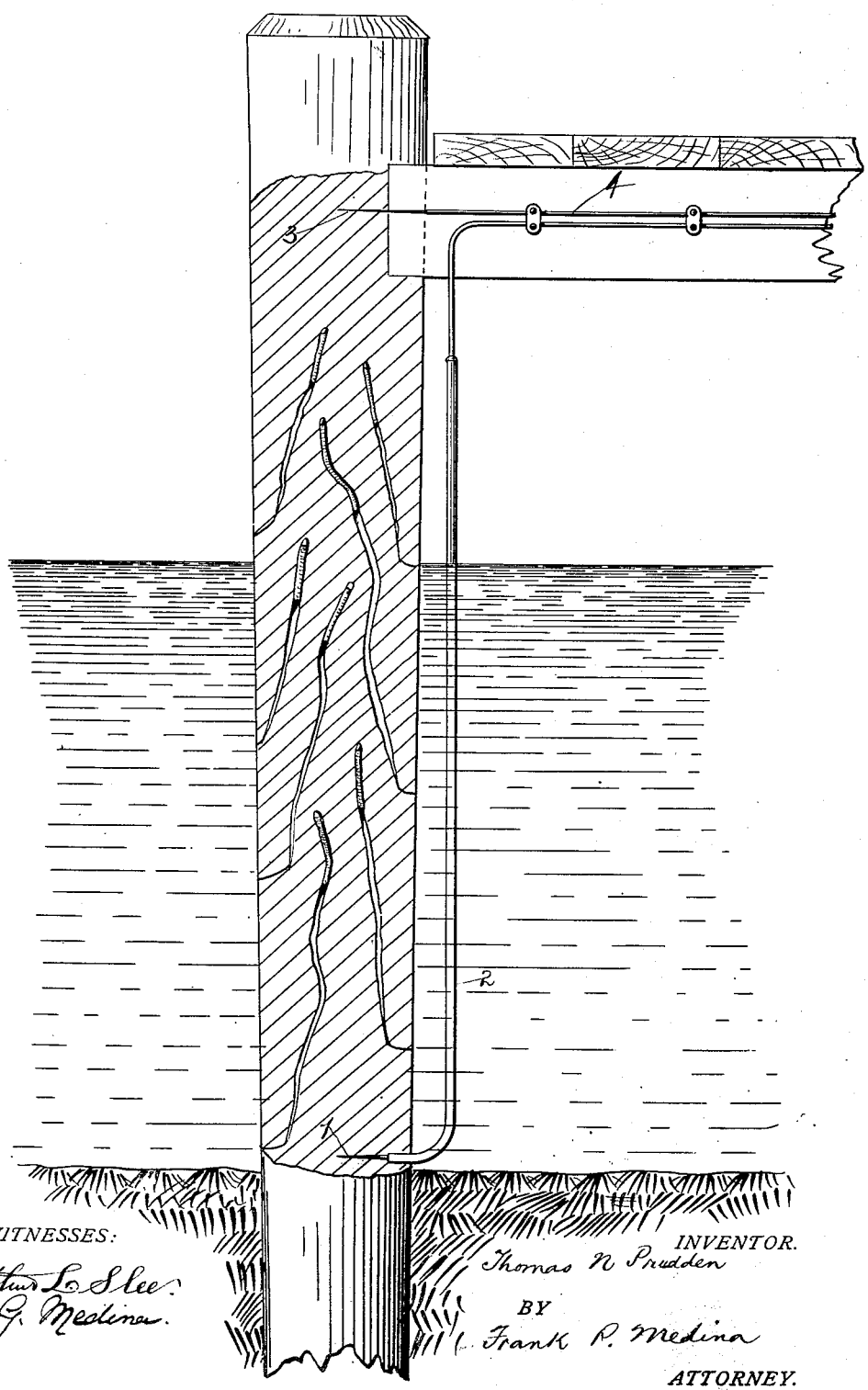
WITNESSES:
INVENTOR.
Thomas N Prudden
BY
Frank P. Medina
ATTORNEY.

UNITED STATES PATENT OFFICE.

THOMAS N. PRUDDEN, OF SAN FRANCISCO, CALIFORNIA.

METHOD AND APPARATUS FOR PROTECTING MARINE WOODEN STRUCTURES.

No. 855,588.      Specification of Letters Patent.      Patented June 4, 1907.

Application filed February 19, 1906. Serial No. 301,928.

*To all whom it may concern:*

Be it known that I, THOMAS N. PRUDDEN, a citizen of the United States, and a resident of the city and county of San Francisco, State of California, have invented a certain new and useful Method and Apparatus for Protecting Marine Wooden Structures, of which the following is a specification.

My invention relates to processes for preserving piles and other marine wooden structures, and has for its object to provide means for protecting said structures from the ravages of the teredo. The teredo is a vermiform mollusk having shells at its anterior extremity with which it bores into the substance of said structures, quickly destroying them. It enters said structures from the waters of the sea, in a minute form, and bores its way deeply into the substance thereof, growing in size, and completely filling the hole which it bores. Many teredos attack said structures and eventually completely honeycomb them.

In order to prevent the attacks of the teredo, many devices have been employed, one of them being the incasement of the structure in a copper sheathing. As the teredo shuns oil, devices for applying oil to the structure above the water line have been produced. But the mode of sheathing in copper is very expensive, and the treatment by oil does not reach below the water line, whereas the teredo enters the structure at many points between the water line and the ground line.

I have discovered that if a water soaked wooden structure immersed in sea water be subjected to a flow of electricity of suitable strength and for a suitable length of time, the structure will be protected from the teredo. Where teredos have already secured a lodgment in said structures the subjection thereof to a flow of electricity will destroy the teredo and prevent the further disintegration of said structure.

My invention may be reduced to practice in various ways and through various constructions. I illustrate one of these constructions in the accompanying drawing which represents a pile sunk in the ground and immersed in the sea water, showing a number of teredos, and a means of subjecting the pile to a flow of electricity.

At a point near the ground line I insert an electrical conductor. 1. into the body of the pile. Said conductor may be inserted in any suitable manner, as by boring an auger hole and driving therein a copper plug. Conductor 1. is electrically attached to a source of electricity through an insulated conductor 2. The insulation about the point where the conductor enters the aforesaid auger hole being so arranged as to prevent leakage at that point from the conductor directly to the sea water. At another point in said pile, which is preferably situated between high and low water mark, I provide another conductor 3, which enters the pile and is also protected by insulation from direct leakage to the sea. Conductor 3. is electrically connected with an opposite source of electricity through an insulated conductor 4. The pile being water soaked, is a conductor through the whole of its substance; and arranged in the illustrated manner, receives a flow of electricity, which passes therethrough between said conductors.

Other modes of connecting a source of electricity may be applied without departing from my invention, as for instance, by grounding the source of current, and causing said current to enter at the upper part, flow downwardly through the pile and outwardly into the sea. So arranged the pile is effectually protected from the teredo. That such a result is produced is not conjectural, but is amply shown by experiment. In one instance, a conductor from a grounded source of supply was attached to the upper part of one among a large number of piles supporting a wharf shortly after the said wharf had been built. Within a few months, all the piles, excepting the one through which the current flowed were destroyed by teredos, while the one which was subjected to the current flow remained intact. The current, so applied, will also kill teredos lodged in a pile, and preserve said pile from further injury. That it should have such effect is a fact connected with the fact of the electrical conductivity of animal organisms. Teredos as aforesaid, completely fill the holes which they bore; and their bodies are therefore in electrical contact with the water soaked wood of the pile. Consequently, when a current flow is passed through the pile, it flows also through the bodies of the contained teredos, in proportion to the conductivity of said bodies to the conductivity of their environment. The physiological effect produced on the said teredos may be due to shock, or to electrolysis, or to both. It puts them in a shriveled and lifeless condition. The fact that it produces the said result is a fact of observation, and I do not deem it necessary for the purposes of this application to discover or explain the physiological or pathological action of the current, in producing said result. That the current necessarily flows through their bodies when the conditions are as illustrated and explained, is a corollary from a well known law of electricity. And as aforesaid, the result obtained is a fact of observation and experiment.

As to the strength of current needed and the time required in treating piles, they vary under different conditions. With a total current of one half an ampere flowing for eight hours I have destroyed the life of teredos lodged in a pile.

Having described my invention what I claim as new and desire to secure by Letters Patent of the United States is, 1. The process of protecting marine wooden structures from teredos, which consists in subjecting the water-soaked substance thereof to a flow of electricity.

2. The process of protecting marine wooden structures from teredos, which consists in subjecting the water-soaked substance thereof and the bodies of teredos contained therein to a flow of electricity.

3. Apparatus for protecting marine wooden structures from teredos consisting of means for subjecting the water soaked substance thereof to a flow of electricity.

4. Apparatus for protecting marine wooden structures from teredos consisting of means for subjecting the water soaked substance thereof and the bodies of teredos contained therein to a flow of electricity.

In testimony whereof I have hereunto signed my name in the presence of two witnesses.

THOMAS N. PRUDDEN.

Witnesses:
FRANK P. MEDINA,
JULIUS CALMAN.